(12) United States Patent
Jung et al.

(10) Patent No.: US 7,372,830 B2
(45) Date of Patent: May 13, 2008

(54) DYNAMIC SUBCHANNEL AND BIT ALLOCATION IN A MULTIUSER-MIMO/OFDMA SYSTEM

(75) Inventors: Young-Ho Jung, Yongin-si (KR);
In-Soon Park, Seoul (KR);
Seung-Hoon Nam, Seoul (KR);
In-Hyoung Kim, Daejeon (KR);
Yong-Hoon Lee, Daejeon (KR)

(73) Assignees: Samsung Electronics Co., Ltd. (KR);
Korea Advanced Institute of Science & Technology (KR)

( * ) Notice: Subject to any disclaimer, the term of this patent is extended or adjusted under 35 U.S.C. 154(b) by 417 days.

(21) Appl. No.: 11/130,484

(22) Filed: May 17, 2005

(65) Prior Publication Data

US 2005/0254457 A1    Nov. 17, 2005

(30) Foreign Application Priority Data

May 17, 2004    (KR) .................... 10-2004-0034960

(51) Int. Cl.
*H04Q 7/00*      (2006.01)
*H04Q 7/28*      (2006.01)
*H04Q 7/24*      (2006.01)
*H04B 7/204*     (2006.01)
*H04B 7/208*     (2006.01)
*H04B 7/02*      (2006.01)
*H04B 7/10*      (2006.01)
*H04M 1/00*      (2006.01)

(52) U.S. Cl. ............... 370/328; 370/319; 370/329; 370/334; 370/341; 370/344; 370/338; 455/101; 455/550.1; 455/561; 375/347

(58) Field of Classification Search ........ 370/328–329, 370/310, 332, 334, 338, 341, 203, 208, 232–235, 370/248–250, 252–253, 319, 350, 437, 465, 370/537–540, 543–544, 913, 295; 455/550.1, 455/556.2, 101–105, 561, 562.1, 452.1–452.2, 455/17, 24, 41.2–41.3, 45, 464, 450–451, 455/466, 509, 575.7, 126, 127.2; 375/146–148, 375/267–268, 295–299, 316, 347, 349, 358
See application file for complete search history.

(56) References Cited

U.S. PATENT DOCUMENTS 7,020,110 B2 *   3/2006   Walton et al. .............. 370/334

(Continued)

*Primary Examiner*—Meless Zewdu
(74) *Attorney, Agent, or Firm*—The Farrell Law Firm, PC (57) ABSTRACT

A resource allocation method in a multiuser-multiple-input multiple-output/orthogonal frequency division multiple access (MIMO/OFDMA) system. In the multiuser-MIMO/OFDMA system feedback information is received from terminals. A channel gain and a transmission rate for each user are determined using the feedback information. An average channel gain for each user is computed according to the channel gain. The average number of bits for each user is determined according to the average channel gain. The number of subchannels for each user is computed according to the average number of bits for each user. At least one subchannel is allocated to each user according to the number of subchannels for each user. A modulation scheme for each of the at least one subchannel is determined. The resource allocation method adaptively allocates subchannels and bits according to channel environment, thereby considerably improving frequency use efficiency as well as a power gain.

10 Claims, 3 Drawing Sheets

U.S. PATENT DOCUMENTS 7,099,678 B2 * 8/2006 Vaidyanathan .............. 455/500
7,116,725 B2 * 10/2006 Ketchum et al. ........... 375/295
2004/0120347 A1 * 6/2004 Lee et al. ................... 370/468

* cited by examiner

DYNAMIC SUBCHANNEL AND BIT ALLOCATION IN A MULTIUSER-MIMO/OFDMA SYSTEM

PRIORITY

This application claims priority to an application entitled "Dynamic Subchannel and Bit Allocation in a Multiuser-MIMO/OFDMA System" filed in the Korean Intellectual Property Office on May 17, 2004 and assigned Serial No. 2004-34960, the contents of which are incorporated herein by reference.

BACKGROUND OF THE INVENTION

1. Field of the Invention

The present invention relates generally to a mobile communication system, and more particularly to a scheme for optimizing subchannel and bit allocation in a multicarrier-based mobile communication system.

2. Description of the Related Art

A multiple-input multiple-output (MIMO) system in the downlink can be broken down to multiple parallel independent single-user MIMO systems. Further, when the orthogonal frequency division multiple access (OFDMA) technology is applied to the downlink MIMO system, a multiuser-MIMO/OFDMA system is provided. In this system, data streams for users are multiplexed over space and frequency, and thus the users receive the spatially multiplexed data streams.

Figure 1:
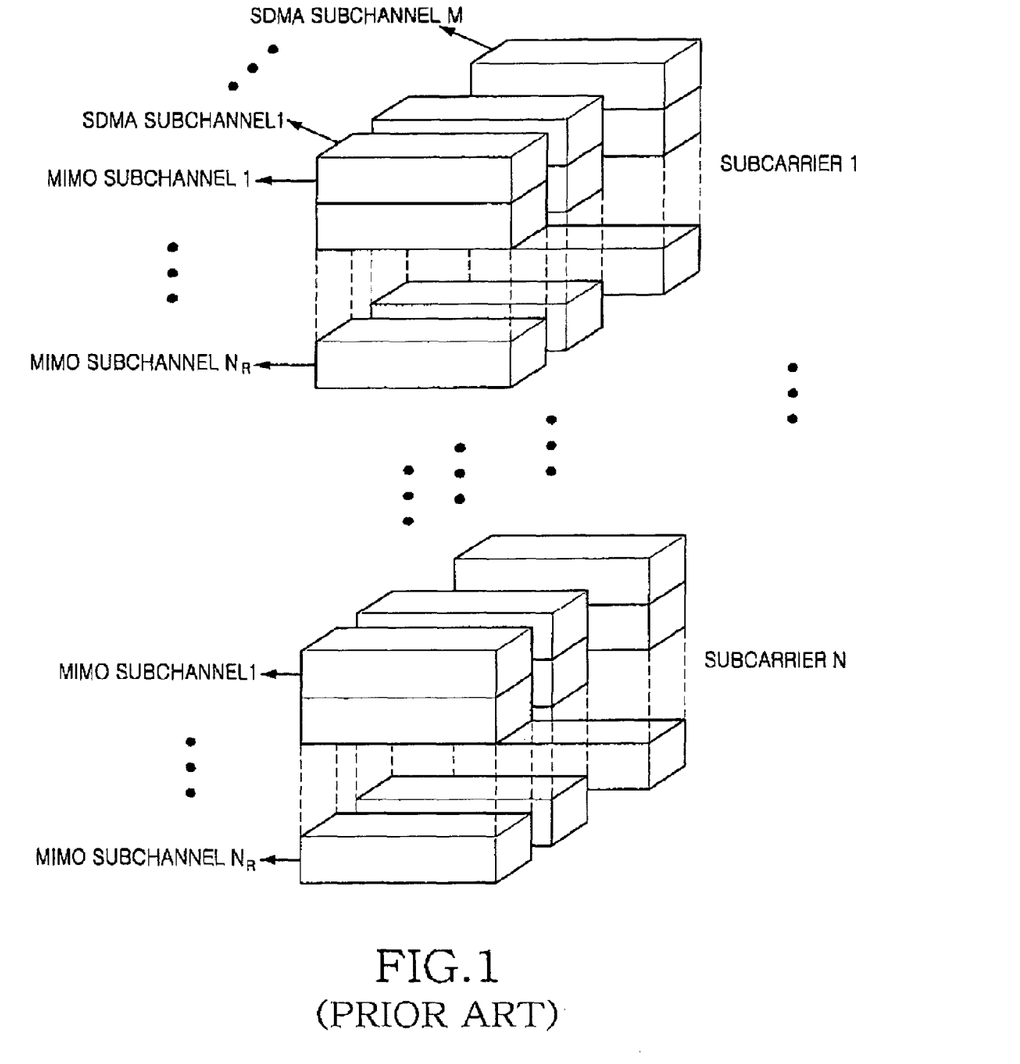
FIG. 1 is a conceptual diagram illustrating subchannels of a multiuser-multiple-input multiple-output/orthogonal frequency division multiple access (MIMO/OFDMA) system.

FIG. 1 is a conceptual diagram illustrating subchannels of a multiuser-multiple-input multiple-output/orthogonal frequency division multiple access (MIMO/OFDMA) system. In the multiuser-MIMO/OFDMA system as illustrated in FIG. 1, there are space division multiple access (SDMA) subchannels in which each user occupies several MIMO subchannels, for each orthogonal frequency division multiplexing (OFDM) subcarrier. The users generate MIMO subchannels using the MIMO technologies, and transmit data through the generated MIMO subchannels. A more important feature of a multiuser-MIMO/OFDMA system design is that SDMA channels are allocated to users, and bits are loaded to the MIMO subchannels allocated to a single user for adaptive modulation.

For subchannel and bit allocation, optimal and suboptimal schemes have been proposed to minimize the overall transmission power under the data rate constraint or to maximize a data rate under the transmission power constraint. For a multiuser-multiple-input single-output (MISO)/OFDM system, a bit allocation scheme for maximizing a signal-to-noise ratio (SNR) has been proposed. More specifically, a suboptimal scheme that takes into account interference and a data rate in a multiuser-MISO/OFDMA system has been proposed. However, when the data rate constraint is present, there is a drawback that the suboptimal scheme can be applied only to an OFDMA system.

SUMMARY OF THE INVENTION

Accordingly, the present invention has been designed to solve the above and other problems occurring in the prior art. Therefore, it is an aspect of the present invention to provide a subchannel and bit allocation method for efficiently allocating subchannels in an orthogonal frequency division multiple access (OFDMA) system using multiple antennas.

It is another aspect of the present invention to provide a subchannel and bit allocation method for improving a power gain, and frequency use efficiency by performing adaptive modulation according to channel state.

The above and other aspects of the present invention can be achieved by a resource allocation method in a multiuser-multiple-input multiple-output/orthogonal frequency division multiple access (MIMO/OFDMA) system including a base station for transmitting signals through a plurality of transmitter antennas, and a plurality of terminals for receiving the signals through receiver antennas. The resource allocation method includes determining a number of subchannels for each user according to a channel environment; and allocating a modulating scheme for each subchannel according to the determined number of subchannels.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

A subchannel and bit allocation method in accordance with preferred embodiments of the present invention will be described in detail herein below with reference to the accompanying drawings. More specifically, the present invention provides an optimal scheme for subchannel and bit allocation, and a suboptimal scheme for separately performing the subchannel and bit allocation.

Figure 2:
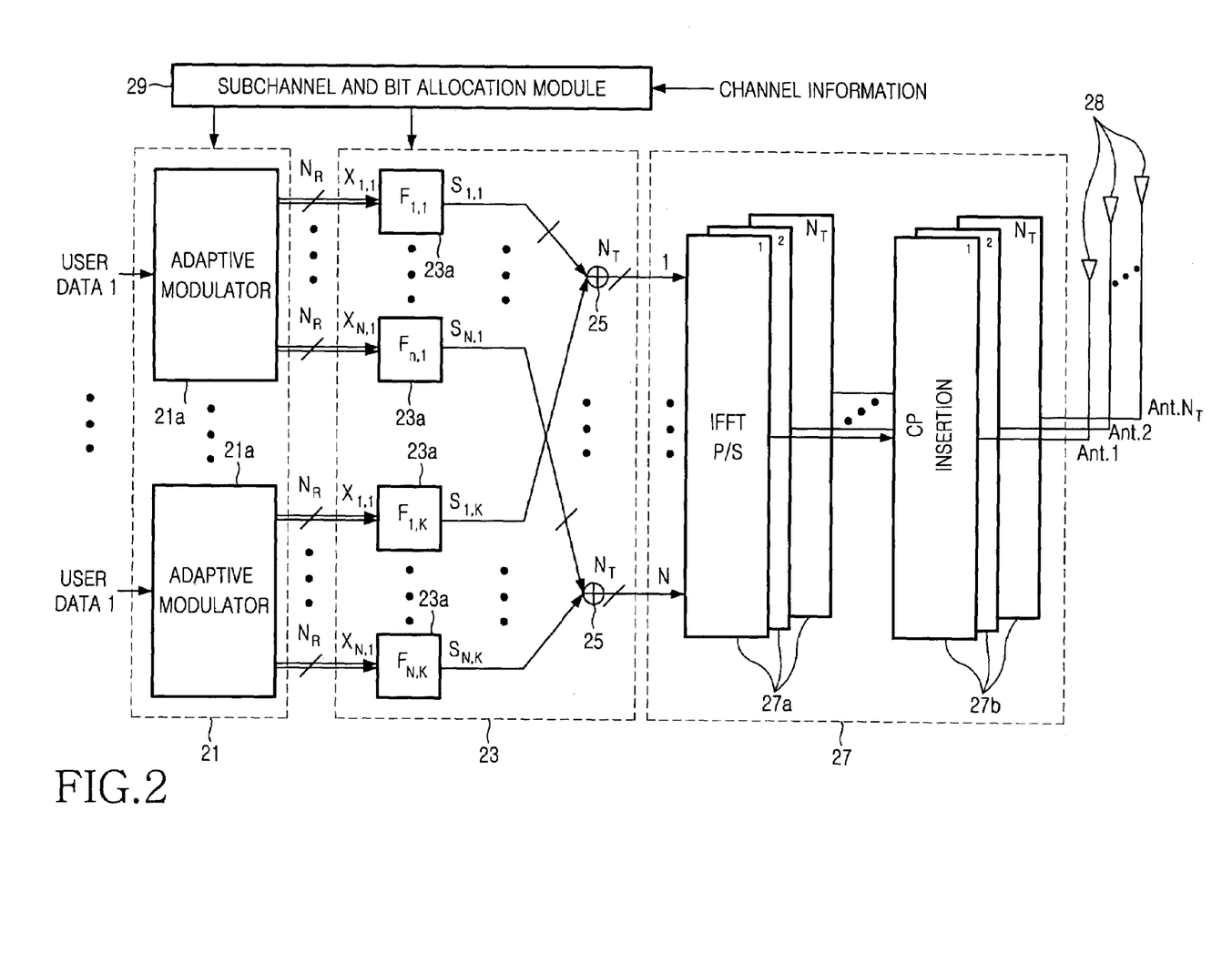
FIG. 2 is a block diagram illustrating a multiuser-MIMO/OFDMA base station to which a subchannel and bit allocation method in accordance with the present invention is applied.

FIG. 2 is a block diagram illustrating a multiuser-multiple-input multiple-output/orthogonal frequency division multiple access (MIMO/OFDMA) base station to which a subchannel and bit allocation method in accordance with the present invention is applied. Referring to FIG. 2, the multiuser-MIMO/OFDMA base station includes a modulation unit 21, a precoding unit 23, and an OFDMA transmission unit 27. The modulation unit 21 includes a plurality of adaptive modulators 21a for processing input data of multiple users. The precoding unit 23 includes a plurality of precoders 23a for precoding signals output from the adaptive modulators 21a, and a plurality of adders 25 for adding outputs of the precoders 23a. The OFDMA transmission unit 27 includes a plurality of Inverse Fast Fourier Transform (IFFT) and parallel-to-serial (P/S) modules 27a, and a plurality of cyclic prefix (CP) insertion modules 27b for inserting CPs into output signals of the IFFT and P/S modules 27a.

The multiuser-MIMO/OFDMA base station further includes a subchannel and bit allocation module 29 for generating information necessary for subchannel and bit allocation using feedback information received from terminals, and providing the generated information to the modulation unit 21 and the precoding unit 23.

The above-described base station transmits signals of N subcarriers through $N_t$ transmitter antennas 28. It is assumed that the channel is flat fading in the present invention. The base station receives downlink channel information from all K user terminals, allocates a set of subchannels to each user terminal, and determines the number of bits to be transmitted through each channel.

The subchannel and bit allocation information is transmitted to user terminals through a separate control channel. When each user terminal has $N_r$ receiver antennas and $N_t = M \cdot N_R$, where M is an integer greater than or equal to 2, M different user terminals occupy M SDMA subchannels per subcarrier, and each user terminal receives $N_R$ spatially multiplexed bit streams through MIMO processing. The bit streams are referred to as MIMO subchannels. $\Omega_n$ denotes an indicator set for M user terminals occupying M SDMA subchannels of the n-th subcarrier. $\Omega_n$ consists of M integers chosen from $\{1, 2, \ldots, K\}$. When an $N_R \times 1$ vector is defined by $X_{n,k}$, $$X_{n,k} = \begin{cases} \text{information symbol vector, if } k \in \Omega_n \\ 0, \text{ otherwise,} \end{cases}$$

When $X_{n,k}$ is multiplied by an $N_T \times N_R$ processing matrix, $S_{n,k} = F_{n,k} X_{n,k}$ is yielded and $$\sum_{k \in \Omega_n} S_{n,k}$$

is transmitted through the n-th subcarrier. However, when $X_{n,k} = 0$, such multiplication is unnecessary.

When the matrix $F_{n,k}$ is properly chosen, the multiuser interference in $$\sum_{k \in \Omega_n} S_{n,k}$$

can be eliminated, and $S_{n,k}$ and $k \in \Omega_n$ can be recovered at a receiver. The matrix $F_{n,k}$ provides M SDMA subchannels associated with single-user MIMO subchannels, such that each user terminal can spatially multiplex $N_R$ data streams.

A transmitter transmits data to K user terminals through all $M \cdot N \cdot N_R$ subchannels under the following conditions:

Condition 1: M SDMA subchannels per subcarrier should be allocated to M different user terminals.

Condition 2: All NR MIMO subchannels associated with one SDMA subchannel should be allocated to a single user terminal occupying the SDMA subchannel.

When M=1, the multiuser-MIMO/OFDMA system is switched to a single-user-MIMO/OFDMA system in which each subcarrier with $N_R$ MIMO subchannels is occupied by a single user terminal. In this case, $N_T = N_R$, $F_{n,k} = E_{n,k}$, and Condition 1 is unnecessary.

Another form of the multiuser-MIMO/OFDMA system is a multiuser-multiple-input single-output (MISO)/OFDMA system having a single receiver antenna, where $N_R = 1$. In this case, $M = N_T$, $F_{n,k} = \overline{N}_{n,k}$, and Condition 2 is unnecessary.

An optimal subchannel and bit allocation scheme based on integer programming (IP) in accordance with the present invention will be described herein below. For convenience, it is assumed that the number of SDMA subchannels for each OFDM subcarrier is 2, i.e., M=2.

A data rate $R_k$ of the k-th user terminal can be expressed as shown in Equation (1).

$$R_k = \sum_{n=1}^{N} \sum_{l=1}^{N_R} \sum_{p=1, p \neq k}^{K} \sum_{c=1}^{C} c \cdot \rho_k(n, l, p, c) \tag{1}$$

$$\triangleq \sum_{n=1}^{N} \sum_{l=1}^{N_R} c_k(n, l),$$

where $$c_k(n, l) = \sum_{p=1, p \neq k}^{K} \sum_{c=1}^{C} c \cdot \rho_{(n,l,p,c)},$$

and C is the maximum number of bits per symbol that can be loaded to one subchannel.

If the k-th and p-th user terminals occupy two SDMA subchannels of the n-th subcarrier, and c bits are allocated to the l-th MIMO subchannel associated with an SDMA subchannel of the k-th user terminal, $\rho_k(n,l,p,c)=1$. Otherwise, $\rho_k(n,l,p,c)=0$.

In Equation (1), $c_k(n,l)$ denotes the number of bits allocated to the l-th MIMO subchannel of the k-th user terminal when the k-th user terminal occupies one of the SDMA subchannels of the n-th subcarrier. The transmission power allocated to the k-th user terminal can be expressed as shown in Equation (2).

$$P_k = \sum_{n=1}^{N} \sum_{l=1}^{N_R} \sum_{p=1, p \neq k}^{K} \sum_{c=1}^{C} \frac{f_k(c)}{\alpha_k^2(n, l, p)} \cdot \rho_k(n, l, p, c) \tag{2}$$

In Equation (2), $f_k(c)$ is the received power required to stably receive c bits per symbol. $\alpha_k(n,l,p)$ is an equivalent channel gain of the l-th MIMO subchannel of the k-th user terminal when the k-th and p-th user terminals occupy two SDMA subchannels of the n-th subcarrier.

It is assumed that the MIMO subchannels are ordered according to their equivalent channel gains without loss of generality, i.e., $|\alpha_k(n,1,p)| \geq |\alpha_k(n,2,p)|$, $\forall k, n, p$.

The optimal subchannel and bit allocation problem for minimizing the total transmission power required to transmit data at a rate of $\{R_1, \ldots, R_K\}$ can be formulated as shown in Equation (3).

$$P_T = \sum_{k=1}^{K} \sum_{n=1}^{N} \sum_{l=1}^{N_R} \sum_{p=1, p \neq k}^{K} \sum_{c=1}^{C} \frac{f_k(c)}{\alpha_k^2(n, l, p)} \cdot \rho_k(n, l, p, c) \tag{3}$$

Constraints:

$$\rho_k(n, l, p, c) \in \{0, 1\}$$

$$R_k = \sum_{n=1}^{N} \sum_{l=1}^{N_R} \sum_{p=1, p \neq k}^{K} \sum_{c=1}^{C} c \cdot \rho_k(n, l, p, c), \forall k$$

-continued $$0 \le \sum_{c=1}^{C} c \cdot \rho_k(n, l, p, c) \le 1, \forall k, n, l, p$$

$$0 \le \sum_{k=1}^{K} \sum_{p=1, p \ne k}^{K} \sum_{c=1}^{C} \rho_k(n, l, p, c) \le 2, \forall n, l$$

$$0 \le \sum_{l=1}^{N_R} \sum_{c=1}^{C} \rho_k(n, l, p, c) \le N_R \delta_k(n, p), \forall k, n, p$$

$$\sum_{k=1}^{K} \sum_{p=1, p \ne k}^{K} \delta_k(n, p) = 2, \forall n$$

$$\delta_k(n, p) = \delta_p(n, k), \forall k, n, p$$

$$\delta_k(n, p) \in \{0, 1\}, \forall k, n, p$$

In Equation (3), $P_T$ denotes an intensity of the total transmission power. If the k-th and p-th user terminals occupy two SDMA subchannels associated with the n-th subcarrier, $\delta_k(n,p)=1$. Otherwise, $\delta_k(n,p)=0$.

In Equation (3), an inequality $$0 \le \sum_{c=1}^{C} \rho_k(n, l, p, c) \le 1, \forall k, n, l, p$$

is needed because c bits ($c \in \{0, \ldots, C\}$) are allocated to each MIMO channel.

$$0 \le \sum_{k=1}^{K} \sum_{p=1, p \ne k}^{K} \sum_{c=1}^{C} \rho_k(n, l, p, c) \le 2, \forall n, l,$$

$$0 \le \sum_{l=1}^{N_R} \sum_{c=1}^{C} \rho_k(n, l, p, c) \le N_R \delta_k(n, p), \forall k, n, p,$$

$$\sum_{k=1}^{K} \sum_{p=1, p \ne k}^{K} \delta_k(n, p) = 2, \forall n, \delta_k(n, p) = \delta_p(n, k), \forall k, n, p,$$

and $\delta_k(n,p) \in \{0,1\}$; $\forall k,n,p$ are included to satisfy Conditions 1 and 2. An optimal solution of the problem is obtained by IP using binary variables.

When M=1 (single-user-MISO/OFDMA), one of the user indices p and the corresponding summations can be removed from Equation (3). As a result, a condition of $\delta_k(n,p)=\delta_p(n,k)$, $\forall k,n,p$ is discarded. Furthermore, in this case, an inequality $$0 \le \sum_{k=1}^{K} \sum_{p=1, p \ne k}^{K} \sum_{c=1}^{C} \rho_k(n, l, p, c) \le 2, \forall n, l$$

required to meet only Condition 1 is discarded.

When $N_R=1$ (multiuser-MISO/OFDMA), the index l for MIMO subchannels and the corresponding summations can be removed from Equation (3). In this case, $$0 \le \sum_{l=1}^{N_R} \sum_{c=1}^{C} \rho_k(n, l, p, c) \le N_R \delta_k(n, p), \forall k, n, p$$

of Equation (3) becomes $$0 \le \sum_{c=1}^{C} \rho_k(n, p, c) \le \delta_k(n, p), \forall k, n, p$$

including $$0 \le \sum_{c=1}^{C} \rho_k(n, l, p, c) \le 1, \forall k, n, l, p$$

of Equation (3). Accordingly, $$0 \le \sum_{c=1}^{C} \rho_k(n, l, p, c) \le 1, \forall k, n, l, p$$

can be discarded.

In the case of the multiuser-MISO/OFDMA system (for convenience, M=2), a single MIMO subchannel associated with a single SDMA subchannel exists. Accordingly, a MIMO subchannel index l can be removed, and only Condition 1 needs to be satisfied. The optimization problem in Equation (3) can be simplified as shown in Equation (4).

$$P_T = \sum_{k=1}^{K} \left[ \sum_{n=1}^{N} \sum_{p=1, p \ne k}^{K} \sum_{c=1}^{C} \frac{f_k(c)}{a_k^2(n, p)} \cdot \rho_k(n, p, c) \right] \quad (4)$$

$$\rho_k(n, p, c) \in \{0, 1\}$$

$$R_k = \sum_{n=1}^{N} \sum_{p=1, p \ne k}^{K} \sum_{c=1}^{C} c \cdot \rho_k(n, p, c) = \sum_{n=1}^{N} c_k(n), \forall k$$

$$0 \le \sum_{k=1}^{K} \sum_{p=1, p \ne k}^{K} \sum_{c=1}^{C} \rho_k(n, p, c) \le 2, \forall n$$

$$0 \le \sum_{c=1}^{C} \rho_k(n, p, c) \le \delta_k(n, p), \forall k, n, p$$

$$\sum_{k=1}^{K} \sum_{p=1, p \ne k}^{K} \delta_k(n, p) = 2, \forall n$$

$$\delta_k(n, p) = \delta_p(n, k), \forall k, n, p$$

$$\delta_k(n, p) \in \{0, 1\}, \forall k, n, p$$

In Equation (4), if the k-th and p-th user terminals occupy two SDMA subchannels of the n-th subcarrier, and c bits are allocated to an MIMO subchannel associated with an SDMA subchannel of the k-th user terminal, $\rho_k(n,l,c)=1$. Otherwise, $\rho_k(n,l,c)=0$.

In Equation (4), $\alpha_k(n,p)$ is an equivalent channel gain of the k-th user terminal when the k-th and p-th user terminals occupy two SDMA subchannels of the n-th subcarrier. In the data rate constraint of $$R_k = \sum_{n=1}^{N} \sum_{p=1, p \neq k}^{K} \sum_{c=1}^{C} c \cdot \rho_k(n, p, c) = \sum_{n=1}^{N} c_k(n), \forall k,$$

$$c_k(n) = \sum_{p=1, p \neq k}^{K} \sum_{c=1}^{C} c \cdot \rho_k(n, p, c)$$

denotes the number of bits allocated to an MIMO subchannel of the k-th user terminal when the k-th user terminal occupies one of the SDMA subchannels of the n-th subcarrier.

In the single-user MIMO/OFDMA system, only Condition 2 should be satisfied because there is one SDMA subchannel per subcarrier. A user index p can be removed.

Accordingly, the optimization problem can be expressed as shown in Equation (5).

$$P_T = \sum_{k=1}^{K} \left[ \sum_{n=1}^{N} \sum_{l=1}^{N_R} \sum_{c=1}^{C} \frac{f_k(c)}{\alpha_k^2(n, l)} \cdot \rho_k(n, l, c) \right] \quad (5)$$

Constraints:

$\rho_k(n, l, c) \in \{0, 1\}$ $R_k = \sum_{n=1}^{N} \sum_{l=1}^{N_R} \sum_{c=1}^{C} c \cdot \rho_k(n, l, c) = \sum_{n=1}^{N} \sum_{l=1}^{N_R} \hat{c}_k(n, l), \forall k$ $0 \leq \sum_{c=1}^{C} \rho_k(n, l, c) \leq 1, \forall k, n, l$ $0 \leq \sum_{l=1}^{N_R} \sum_{c=1}^{C} \rho_k(n, l, c) \leq N_R \delta_k(n), \forall k, n$ $\sum_{k=1}^{K} \delta_k(n) = 1, \forall n$ $\delta_k(n) \in \{0, 1\}, \forall k, n$ In Equation (5), if the k-th user terminal occupies one SDMA subchannel of the n-th subcarrier, c bits are allocated to the l-th MIMO subchannel associated with the SDMA subchannel of the k-th user terminal, $\rho_k(n,l,c)=1$. Otherwise, $\rho_k(n,l,c)=0$.

In Equation (5) and its constraint $$R_k = \sum_{n=1}^{N} \sum_{l=1}^{N_R} \sum_{c=1}^{C} c \cdot \rho_k(n, l, c) = \sum_{n=1}^{N} \sum_{l=1}^{N_R} \hat{c}_k(n, l), \forall k, \alpha_k(n, l)$$

and $$c_k(n, l) = \sum_{c=1}^{C} c \cdot \rho_k(n, l, c)$$

denote an equivalent channel gain and the number of bits associated with the l-th MIMO subchannel of the k-th user terminal, respectively, when the k-th user terminal occupies an SDMA subchannel of the n-th subcarrier. If the k-th user terminal occupies an SDMA subchannel of the n-th subcarrier, a binary variable $\delta_k(n)=1$. Otherwise, $\delta_k(n)=0$.

Conventionally, IP requires an exponential time algorithm whose complexity rapidly increases with the number of constraints and variables.

Now, the behavior of the optimal IP algorithm is examined through computer simulation, and several observations are performed in relation to bit allocation.

The optimal IP algorithm was simulated using multiuser-MIMO/OFDMA, multiuser-MISO/OFDMA, and single-user-MIMO/OFDMA systems. Table 1 describes system parameters used in the simulation.

TABLE 1

| | Multiuser-MIMO/OFDMA | Multiuser-MISO/OFDMA | Single-user-MIMO/OFDMA |
|---|---|---|---|
| $N_T$ | 4 | 2 | 2 |
| $N_R$ | 2 | 1 | 2 |
| M | 2 | 2 | 1 |
| # of FFT (N) | 64 | 64 | 64 |
| Total # of subchannels | 256 | 128 | 128 |
| # of users (K) | | 4 | |
| # of max. bits (C) | | 12 | |
| Required BER | | $10^{-4}$ | |
| Channel | 8-tap frequency selective Rayleigh fading channels with exponentially decaying power profiles were assumed. The channel parameters were fixed during one frame period. The average channel magnitudes of the different users were generally unequal and the difference, denoted by $\gamma$, between the strongest and weakest channels of the four users was either zero or 30 dB. | | |

For the multiuser-MIMO/OFDMA system, Table 2 describes the number of subchannels allocated to each user terminal and the number of bits allocated to each subchannel where $R_1=R_2=R_3=R_4=256$.

TABLE 2

| γ (dB) | MIMO subchannel group | User k | # of assigned MIMO subchannels | # of MIMO subchannels with $c_k(n,l) = i$ bits | | | | | Ratio $\dfrac{\alpha_k^2}{\overline{\alpha}_k^2}$ |
|---|---|---|---|---|---|---|---|---|---|
| | | | | i = 2 | i = 4 | i = 6 | i = 8 | i = 10 | |
| 0 | l = 1 | 1 | 34 | 0 | 13 | 21 | 0 | 0 | 0.77 |
| | | 2 | 28 | 0 | 0 | 28 | 0 | 0 | 0.87 |
| | | 3 | 32 | 0 | 9 | 23 | 0 | 0 | 0.73 |
| | | 4 | 34 | 0 | 15 | 19 | 0 | 0 | 0.83 |
| | | Total | 128 | 0 | 37 | 91 | 0 | 0 | |
| | l = 2 | 1 | 30 | 21 | 9 | 0 | 0 | 0 | 0.58 |
| | | 2 | 27 | 10 | 17 | 0 | 0 | 0 | 0.50 |
| | | 3 | 31 | 21 | 10 | 0 | 0 | 0 | 0.57 |
| | | 4 | 32 | 23 | 9 | 0 | 0 | 0 | 0.49 |
| | | Total | 120 | 75 | 45 | 0 | 0 | 0 | |
| 30 | l = 1 | 1 | 63 | 31 | 32 | 0 | 0 | 0 | 0.88 |
| | | 2 | 28 | 0 | 1 | 27 | 0 | 0 | 0.79 |
| | | 3 | 20 | 0 | 0 | 4 | 16 | 0 | 0.74 |
| | | 4 | 17 | 0 | 0 | 0 | 10 | 7 | 0.72 |
| | | Total | 128 | 31 | 33 | 31 | 26 | 7 | |
| | l = 2 | 1 | 33 | 33 | 0 | 0 | 0 | 0 | 0.42 |
| | | 2 | 25 | 6 | 18 | 1 | 0 | 0 | 0.46 |
| | | 3 | 20 | 0 | 8 | 12 | 0 | 0 | 0.57 |
| | | 4 | 17 | 0 | 0 | 15 | 2 | 0 | 0.56 |
| | | Total | 95 | 39 | 26 | 28 | 2 | 0 | |

Because equivalent channel gains of two MIMO subchannels ($N_R$=2), $\{\alpha_k(n,l,p), l=1,2\}$, are different in most cases, the results are sorted into two groups. The first group includes resulting values associated with an MIMO subchannel with a larger equivalent channel gain $\alpha_k(n,l,p)$, and the second group includes the rest. In relation to channels with the same channel gain (γ=0), subchannels are almost equivalently distributed to user terminals. That is, 28 to 34 subchannels of Group 1 are allocated to each user, and 27 to 32 subchannels of Group 2 are allocated to each user. Where γ=30 dB, a large number of subchannels were allocated to User Terminal 1 with the lowest average channel magnitude, and a small number of subchannels were allocated to User Terminal 4 with the highest average channel magnitude. This occurred because $R_1=R_2=R_3=R_4$.

It is important to observe that the optimal IP often loaded the same number of bits (or constellation size) for subchannels allocated to one user. This indicates that $c_k(n,l)$ in Equation (1) tends to be the same regardless of n. More specifically, $c_k(l)$ indicates the dominant constellation.

When γ=0 dB, $c_1(1)=6$ because 21 out of 34 MIMO subchannels were loaded 6 bits. The remaining 13 subchannels were loaded 4 bits. Accordingly, the dominant constellation for each pair of (k,l) can be found.

When the same experiment are repeated 1,000 times as shown in Table 3, it was observed that about 70% of $c_k(n,l)$ were equal to their corresponding dominant constellation $c_k(l)$, and almost all $c_k(n,l)$ were in the neighborhood of $c_k(l)$.

TABLE 3

| | γ = 0 dB | γ = 30 dB |
|---|---|---|
| $\Pr\left(c_k(n,l) = c_k(l) \,\middle|\, \sum_{p=1,p\neq k}^{K}\sum_{c=1}^{C}\rho_k(n,l,p,c) = 1\right)$ | 0.69 | 0.74 |
| $\Pr\left(c_k(n,l) = c_k(l) \,\middle|\, \sum_{p=1,p\neq k}^{K}\sum_{c=1}^{C}\rho_k(n,l,p,c) = 1\right) + \Pr\left(c_k(n,l) = c_k(l) \pm 2 \,\middle|\, \sum_{p=1,p\neq k}^{K}\sum_{c=1}^{C}\rho_k(n,l,p,c) = 1\right)$ | 0.99 | 0.99 |

The observation regarding the dominant constellation is essential to obtain a suboptimal algorithm.

Table 2 describes a ratio of average subchannel gains $\alpha_k^2(l)$ and $\overline{\alpha}_k^2(l)$. This ratio had only a small variation. Accordingly, this ratio will also be useful for the suboptimal algorithm.

When $R_1=R_2=R_3=R_4=128$ in the multiuser-MISO/OFDMA system and the single-user-MIMO/OFDMA system, Tables 4 and 5 show the resulting number of subchannels allocated to each user terminal and the number of bits allocated to each subchannel.

TABLE 4

| γ (dB) | User k | # of assigned MIMO subchannels | # of MIMO subchannels with $c_k(n) = i$ bits | | | | | Ratio $\dfrac{\alpha_k^2}{\bar{\alpha}_k^2}$ |
|---|---|---|---|---|---|---|---|---|
| | | | i = 2 | i = 4 | i = 6 | i = 8 | i = 10 | |
| 0 | 1 | 33 | 2 | 31 | 0 | 0 | 0 | 0.83 |
| | 2 | 30 | 0 | 26 | 4 | 0 | 0 | 0.76 |
| | 3 | 32 | 6 | 20 | 6 | 0 | 0 | 0.75 |
| | 4 | 33 | 2 | 31 | 0 | 0 | 0 | 0.81 |
| | Total | 128 | 10 | 108 | 10 | 0 | 0 | |
| 30 | 1 | 54 | 44 | 10 | 0 | 0 | 0 | 0.88 |
| | 2 | 32 | 7 | 18 | 7 | 0 | 0 | 0.80 |
| | 3 | 21 | 0 | 5 | 10 | 6 | 0 | 0.89 |
| | 4 | 20 | 0 | 1 | 14 | 5 | 0 | 0.87 |
| | Total | 127 | 51 | 34 | 31 | 11 | 0 | |

TABLE 5

| γ (dB) | MIMO subchannel group | User k | # of assigned MIMO subchannels | # of MIMO subchannels with $c_k(n, l) = i$ bits | | | | | Ratio $\dfrac{\alpha_k^2(l)}{\bar{\alpha}_k^2(l)}$ |
|---|---|---|---|---|---|---|---|---|---|
| | | | | i = 2 | i = 4 | i = 6 | i = 8 | i = 10 | |
| 0 | l = 1 | 1 | 19 | 0 | 14 | 5 | 0 | 0 | 0.87 |
| | | 2 | 16 | 0 | 3 | 13 | 0 | 0 | 0.82 |
| | | 3 | 14 | 0 | 3 | 11 | 0 | 0 | 0.74 |
| | | 4 | 15 | 0 | 4 | 11 | 0 | 0 | 0.71 |
| | | Total | 64 | 0 | 24 | 40 | 0 | 0 | |
| | l = 2 | 1 | 19 | 17 | 2 | 0 | 0 | 0 | 0.66 |
| | | 2 | 16 | 13 | 3 | 0 | 0 | 0 | 0.60 |
| | | 3 | 14 | 3 | 11 | 0 | 0 | 0 | 0.47 |
| | | 4 | 14 | 5 | 9 | 0 | 0 | 0 | 0.62 |
| | | Total | 63 | 38 | 25 | 0 | 0 | 0 | |
| 30 | l = 1 | 1 | 38 | 17 | 21 | 0 | 0 | 0 | 0.83 |
| | | 2 | 11 | 0 | 0 | 8 | 3 | 0 | 0.90 |
| | | 3 | 8 | 0 | 0 | 0 | 5 | 3 | 0.84 |
| | | 4 | 7 | 0 | 0 | 0 | 0 | 7 | 0.96 |
| | | Total | 64 | 17 | 21 | 8 | 8 | 10 | |
| | l = 2 | 1 | 5 | 5 | 0 | 0 | 0 | 0 | 0.40 |
| | | 2 | 11 | 0 | 5 | 6 | 0 | 0 | 0.43 |
| | | 3 | 8 | 0 | 0 | 3 | 5 | 0 | 0.54 |
| | | 4 | 7 | 0 | 0 | 1 | 4 | 2 | 0.64 |
| | | Total | 31 | 5 | 5 | 10 | 9 | 2 | |

We can also find the same observation regarding the dominant constellation and the ratio between average subchannel gains as in the multiuser-MIMO/OFDMA system. $c_k$ denotes the dominant constellation in the multiuser-MISO/OFDMA system.

When γ=0 dB, $c_1$=4 because 31 out of 33 subchannels were loaded 4 bits. The remaining two subchannels were loaded 2 bits (refer to Table 4). Accordingly, the dominant constellation for each user terminal k can be found. From Table 5, the dominant constellation $c_k(l)$ in the single-user-MIMO/OFDMA system can also be determined. Further, in Table 5, ratios between average subchannel gains only have a small variation.

Suboptimal Subchannel and Bit Allocation

A preferred embodiment of the present invention separates the subchannel and bit allocation problem into two steps to reduce complexity.

In the first step, subchannels are allocated under the assumption of dominant constellation.

Dominant Constellation of Multiuser-MIMO/OFDMA $$c_k(n, l) = \begin{cases} c_k(l), & \text{if } \sum_{p=1, p \neq k}^{K} \sum_{c=1}^{C} \rho_k(n, l, p, c) = 1 \\ 0, & \text{otherwise.} \end{cases}$$

Dominant Constellation of Multiuser-MISO/OFDMA $$c_k(n) = \begin{cases} c_k, & \text{if } \sum_{p=1, p \neq k}^{K} \sum_{c=1}^{C} \rho_k(n, p, c) = 1 \\ 0, & \text{otherwise.} \end{cases}$$

Dominant Constellation of Single-User-MIMO/OFDMA $$c_k(n, l) = \begin{cases} c_k(l), & \text{if } \sum_{c=1}^{C} \rho_k(n, l, c) = 1 \\ 0, & \text{otherwise.} \end{cases}$$

In the second step, bits are distributed to subchannels allocated in the first step. Accordingly, the assumption in the first step is not assumed in this step. The subchannel allocation in the first step can be performed via suboptimal algorithms, while the bit allocation in the second step can adopt a greedy algorithm. By separately performing subchannel and bit allocation, this yields a suboptimal algorithm that is considerably simpler to implement than the optimal IP approach.

Subchannel Allocation

Using the dominant constellation of the multiuser-MIMO/OFDMA, the optimal subchannel allocation problem in the first step can be expressed as shown in Equation 6.

$$P_T = \sum_{n=1}^{N} \sum_{k=1}^{K} \sum_{p=1, p \neq k}^{K} g_k(n, p) \cdot \delta_k(n, p) \text{ for } \delta_k(n, p) \in \{0, 1\} \quad (6)$$

$$\sum_{k=1}^{K} \sum_{p=1, p \neq k}^{K} \delta_k(n, p) = 2, \forall n$$

$$\sum_{n=1}^{N} \delta_k(n, p) \leq N, \forall k, p$$

$$\sum_{n=1}^{N} \sum_{p=1, p \neq k}^{K} \delta_k(n, p) = r_k, \forall k$$

$$\delta_k(n, p) = \delta_p(n, k), \forall k, n, p$$

In Equation (6), $$g_k(n, p) = \sum_{l=1}^{N_R} \frac{f_k(c_k(l))}{\alpha_k^2(n, l, p)}$$

and $$r_k = \frac{R_k}{\sum_{l=1}^{N_R} c_k(l)},$$

and $$\sum_{n=1}^{N} \delta_k(n, p) \leq N, \forall k, p$$

is an auxiliary constraint, which is always true due to $\delta_k(n,p) \in \{0,1\}$. The auxiliary constraint is included for the purpose of finding a useful observation. Equation (6) is considerably simpler than the original IP of Equation (3).

Furthermore, an efficient heuristic algorithm can be found for the following observation.

Observation 1: Suppose that $\{c_k(l)\}$ are known. Then, $\{f_k(c_k(l))\}$ becomes known and Equation (6) takes the form of a transportation problem that can be relaxed to linear programming (LP).

In Equation (6), the combination of two user terminals k and p, $\{(k,p)\}$, is supplied to each subcarrier depending on the costs $\{g_k(n,p)\}$. $\delta_k(n,p)$ is the number of units shipped from the combination (k,p) to the n-th subcarrier if the k-th and p-th users occupy two SDMA subchannels of the n-th subcarrier. The constraints in Equation (6) are the demand and supply constraints, respectively, of the transportation problem.

In the case of transportation, it is straightforward to show that IP is relaxed to LP.

In addition, there are efficient heuristic algorithms. One such algorithm is known as Vogel's method capable of being modified to take account of the additional constraints of $$\sum_{n=1}^{N} \sum_{p=1, p \neq k}^{K} \delta_k(n, p) = r_k, \forall k$$

and $\delta_k(n,p) = \delta_p(n,k)$, $\forall k,n,p$ in Equation (6), even though the whole optimization in Equation (6) cannot be relaxed to LP. In the suboptimal algorithm in accordance with the present invention, the problem is solved using the modified Vogel's method.

Before solving the optimization problem in the first step, $\{c_k(l)\}$ in the dominant constellation can be obtained during an initial phase. Evaluation of $\{c_k(l)\}$ requires the following assumption on the channel gain:

$$\alpha_k^2(n, l, p) = \begin{cases} \alpha_k^2(l), & \text{if } \delta_k(n, p) = 1 \\ 0, & \text{otherwise,} \end{cases}$$

where $\alpha_k^2(l)$ is the average of all subchannel gains associated with the k-th user and MIMO subchannel group l.

Under the above assumption, Equation (6) can be simplified as shown in Equation (7).

$$P_T = \sum_{k=1}^{K} \sum_{l=1}^{N_R} \frac{f_k(c_k(l))}{\alpha_k^2(l)} \cdot \frac{R_k}{\sum_{l=1}^{N_R} c_k(l)} \quad (7)$$

$$\text{Constraint: } \sum_{k=1}^{K} \frac{R_k}{\sum_{l=1}^{N_R} c_k(l)} = 2N,$$

where $$\sum_{n=1}^{N} \sum_{p=1, p \neq k}^{K} \delta_k(n, p)$$

is replaced with $$R_k / \sum_{l=1}^{N_R} c_k(l),$$

due to the constraint of $$\sum_{n=1}^{N} \sum_{p=1, p \neq k}^{K} \delta_k(n, p) = r_k, \forall k$$

in Equation (6).

The solution $\{c^*_k(l)\}$ of Equation (7) can be obtained by introducing a Lagrange multiplier μ and using a numerical technique, such as vector-form Newton's method. Although the obtained $\{c^*_k(l)\}$ are not integers, they can still be used for the optimization in Equation (6).

The optimization in Equation (6) is an IP problem with much computational load.

As described above, to reduce the load, a heuristic subchannel allocation algorithm is developed by modifying Vogel's method. The modification is to put the additional constraints of $$\sum_{n=1}^{N} \sum_{p=1, p \neq k}^{K} \delta_k(n, p) = r_k, \forall k$$

and $\delta_k(n,p)=\delta_p(n,k)$, $\forall k,n,p$ in Equation (6) into the suitable steps of Vogel's method.

To describe the heuristic algorithm, the following notations are necessary: S and U denotes sets of subcarrier and user indices, respectively. These sets are defined in Equation (8) and Equation (9).

$$S \subseteq \{1,2,\ldots,N\} \quad (8)$$

$$U \subseteq \{(k,p)|k=1,\ldots,K, p=1,\ldots,K, k \neq p\} \quad (9)$$

$P_n$ is the penalty defined as the difference between the two smallest cost values in $\{g_m(n,p)|k=1,\ldots,K, p=1,\ldots,K, k\neq p\}$. More specifically, $P_n = g_k^{(2)}(n,p) - g_k^{(1)}(n,p)$, where $g_k^{(i)}(n,p)$ denotes the i-th smallest value among $\{g_k(n,p)|k=1,\ldots,K, p=1,\ldots,K, k\neq p\}$. At the beginning, $S=\{1,2,\ldots,N\}$ and $U=\{(k,p)|k=1,\ldots,K, p=1,\ldots,K, k\neq p\}$. The heuristic algorithm is stated as follows:

Initialization
Set $\delta_k(n,p)$ to zero for all k, n, and p.
Subcarrier index set $S=\{1,2,\ldots,N\}$
Subcarrier index set $\{(k,p)|k=1,\ldots,K, p=1,\ldots,K, k\neq p\}$.
Calculate initial penalties $\{P_n|=1,\ldots,N\}$.
Iteration
Repeat the following operations until S becomes the null set φ.
$\hat{n} = \arg\max_{n \in S} P_n$
$(\hat{k},\hat{p}) = \arg\min_{(k,p) \in U} g_k(\hat{n},p)$
Set $\delta_{\hat{k}}(\hat{n},\hat{p})$ to one. $\delta_{\hat{p}}(\hat{n},\hat{k})$ also becomes one due to $\delta_k(n,p)=\delta_p(n,k)$, $\forall k,n,p$.
Then $S=S-\{\hat{n}\}$ since $$\sum_{k=1}^{K} \sum_{p=1, p \neq k}^{K} \delta_k(n, p) = 2, \forall n$$

is met.
If $$\sum_{n=1}^{N} \sum_{p=1, p \neq k}^{K} \delta_k(n, p) = r_k, \forall k$$

is satisfied, then $U = U - \{(\hat{k},\hat{p})\}$ and update the penalties for the subcarriers whose indices are in the set S.

For each iteration of this algorithm, the size of the subcarrier index set S is reduced by one, due to the constraints of $$\sum_{k=1}^{K} \sum_{p=1, p \neq k}^{K} \delta_k(n, p) = 2, \forall n$$

and $\delta_k(n,p)=\delta_p(n,k)$, $\forall k,n,p$ in Equation (6). The user index set U is reduced and the penalty $\{P_n\}$ is updated, whenever the constraint of $$\sum_{n=1}^{N} \sum_{p=1, p \neq k}^{K} \delta_k(n, p) = r_k, \forall k$$

in Equation (6) is satisfied for a certain k.

In summary, the subchannel allocation for the suboptimal approach in accordance with the present invention is as follows:

Heuristic

Step 1: Evaluate real-valued $\{c^*_k(l)\}$ from Equation (7) using the vector-form Newton's method.

Step 2: Substitute $\{c^*_k(l)\}$ for $\{c_k(l)\}$ in Equation (6) and solve Equation (6) using the above-described modified Vogel's method to obtain $\{\delta_k(n,p)\}$.

The overall heuristic algorithm for subchannel allocation requires $O(K^2)$ operations for one iteration of the vector-form Newton's method, and requires $O(NK^4)$ operations for the heuristic algorithm. This is a polynomial-time algorithm that can be applied to real-time multiuser-MIMO/OFDMA systems.

Except for the values of $$g_k(n, p) = \frac{f_k(c_k)}{\alpha_k^2(n, p)}$$

and $$r_k = \frac{R_k}{c_k},$$

the channel allocation method in the multiuser-MISO/OFDMA system is the same as the optimization method in Equation (6). Accordingly, the proposed heuristic algorithm can be applied to the multiuser-MISO/OFDMA system.

$$P_T = \sum_{n=1}^{N} \sum_{k=1}^{K} g_k(n) \cdot \delta_k(n) \quad (10)$$

Constraints:

$$\delta_k(n) \in \{0, 1\}$$

$$\sum_{k=1}^{K} \delta_k(n) = 1, \forall n$$

-continued $$\sum_{n=1}^{N} \delta_k(n) = r_k, \forall k,$$

where $$g_k(n) = \sum_{l=1}^{N_R} \frac{f_k(c_k(l))}{\alpha_k^2(n,l)}$$

and $$r_k = \frac{R_k}{\sum_{l=1}^{N_R} c_k(l)}.$$

This is again an IP problem, but it is considerably simpler than the original IP in Equation (5).

Furthermore, we can find some suboptimal algorithms for this problem due to the following observation:

Observation 2: Suppose that $\{c_k(l)\}$ are known. Then, $\{f_k(c_k(l))\}$ become known and Equation (10) takes the form of a transportation problem that can be relaxed to linear programming (LP).

In Equation (10), N subcarriers are supplied to K users depending on the costs $\{g_k(n)\}$. $\delta_k(n)$ is the number of units shipped from the n-th subcarrier to the k-th user. The constraints of $$\sum_{k=1}^{K} \delta_k(n) = 1, \forall n$$

and $$\sum_{n=1}^{N} \delta_k(n) = r_k,$$

∀k in Equation (10) are the supply and demand constraints, respectively, of the transportation problem. As described above, a transportation problem can be solved by LP relaxation and Vogel's method.

Before solving the optimization problem in the first step, $\{c_k(l)\}$ can be obtained during an initial phase.

Evaluation of $\{c_k(l)\}$ requires the following assumption on the channel gain:

$$\alpha_k^2(n,l) = \begin{cases} \alpha_k^2(l), & \text{if } \delta_k(n) = 1 \\ 0, & \text{otherwise,} \end{cases}$$

where $\alpha_k^2(l)$ is the average of all subchannel gains associated with the k-th user and MIMO subchannel group l.

Under the above assumption, the optimization problem in Equation (10) can be simplified as shown in Equation (11).

$$P_T = \sum_{k=1}^{K} \sum_{l=1}^{N_R} \frac{f_k(c_k(l))}{\alpha_k^2(l)} \cdot \frac{R_k}{\sum_{l=1}^{N_R} c_k(l)} \quad (11)$$

$$\text{Constraint:} \sum_{k=1}^{K} \frac{R_k}{\sum_{l=1}^{N_R} c_k(l)} = N,$$

where $$\sum_{n=1}^{N} \delta_k(n)$$

is replaced with $$\frac{R_k}{\sum_{l=1}^{N_R} c_k(l)},$$

due to the constraint of $$\sum_{n=1}^{N} \delta_k(n) = r_k, \forall k$$

in Equation (10). Thereafter, the solution $\{c^*_k(l)\}$ of Equation (11) can be obtained by introducing a Lagrange multiplier μ and using a numerical technique, such as vector-form Newton's method.

Finally, the suboptimal approaches to the subchannel allocation in the single-user-MIMO/OFDMA system in accordance with the present invention are as follows:

Suboptimal LP

Step 1: Evaluate real-valued $\{c^*_k(l)\}$ from Equation (11) using the vector-form Newton's method.

Step 2: Substitute $\{c^*_k(l)\}$ for $\{c_k(l)\}$ in Equation (10) and solve Equation (10) using LP after dropping the integer constraints from $\{\delta_k(n, p)\}$ in order to obtain $\{\delta_k(n,p)\}$.

Heuristic

Step 1: Evaluate real-valued $\{c^*_k(l)\}$ from Equation (11) using the vector-form Newton's method.

Step 2: Substitute $\{c^*_k(l)\}$ for $\{c_k(l)\}$ in Equation (10) and solve Equation (10) using Vogel's method to obtain $\{\delta_k(n, p)\}$.

The computational load required by Vogel's method is $O(NK^2)$, while the computation load for LP is $O(N^4)$. Because usually N>>K, Vogel's method is considerably simpler to implement than LP.

The overall heuristic algorithm for subchannel allocation requires $O(K^2)$ operations for one iteration of the vector-form Newton's method, and requires $O(NK^2)$ operations for the heuristic algorithm. This is a polynomial-time algorithm that can be applied to real-time single-user-MIMO/OFDMA systems.

Bit Allocation

The bit allocation problem in the multiuser-MIMO/OFDMA system can be expressed as shown in Equation (12).

$$P_T = \sum_{k=1}^{K} \left[ \sum_{n=1}^{N} \sum_{p=1,p\neq k}^{K} \sum_{l=1}^{N_R} \frac{f_k(c_k(n,l))}{\alpha_k^2(n,l,p)} \cdot \delta_k(n,p) \right] \quad (12)$$

$$\text{Constraint: } R_k = \sum_{n=1}^{N} \sum_{p=1,p\neq k}^{K} \sum_{l=1}^{N_R} c_k(n,l) \cdot \delta_k(n,p), \forall k,$$

where only $\{c_k(n,l) \in \{0, \ldots, C\}\}$ are treated as variables since $\{\delta_k(n,p)\}$ are already determined through the subchannel allocation.

Equation (12) reveals that the bit allocation for each user can be independently performed. Under the constraint $$R_k = \sum_{n=1}^{N} \sum_{p=1,p\neq k}^{K} \sum_{l=1}^{N_R} c_k(n,l) \cdot \delta_k(n,p), \forall k,$$

$$\sum_{k=1}^{K} \left[ \sum_{n=1}^{N} \sum_{p=1,p\neq k}^{K} \sum_{l=1}^{N_R} \frac{f_k(c_k(n,l))}{\alpha_k^2(n,l,p)} \cdot \delta_k(n,p) \right]$$

for each k is minimized, and the total power $P_T$ is eventually minimized. This fact indicates that the bit allocation for each user can be performed as in the case of single-user OFDM. Accordingly, it is possible to apply the greedy algorithm proposed for single-user OFDM.

Equations (13) and (14) are the bit allocation problems of multiuser-MISO/OFDMA and single-user-MIMO/OFDMA systems, respectively.

$$P_T = \sum_{k=1}^{K} \left[ \sum_{n=1}^{N} \sum_{p=1,p\neq k}^{K} \frac{f_k(c_k(n))}{\alpha_k^2(n,p)} \cdot \delta_k(n,p) \right] \quad (13)$$

$$\text{Constraint: } R_k = \sum_{n=1}^{N} \sum_{p=1,p\neq k}^{K} c_k(n) \cdot \delta_k(n,p), \forall k$$

$$P_T = \sum_{k=1}^{K} \left[ \sum_{n=1}^{N} \sum_{l=1}^{N_R} \frac{f_k(c_k(n,l))}{\alpha_k^2(n,l)} \cdot \delta_k(n) \right] \quad (14)$$

$$\text{Constraint: } R_k = \sum_{n=1}^{N} \sum_{l=1}^{N_R} c_k(n,l) \cdot \delta_k(n), \forall k$$

Like the case of the multiuser-MIMO/OFDMA system, Equations (13) and (14) are also solved using the greedy algorithm.

The bit allocation for multiuser-MIMO/OFDMA and multiuser-MISO/OFDMA systems requires $O(NK^2)$ operations, while the bit allocation for single-user-MIMO/OFDMA needs $O(NK)$ operation.

The optimal IP and suboptimal algorithm were examined. For comparison, also considered were the random algorithm where subchannels were randomly allocated and bits were allocated by the greedy algorithm. Accordingly, the parameters were the same as those in Table 1.

For the multiuser-MIMO/OFDMA system, the simulation results were the average of 100 trials.

Table 6 shows the resulting transmission power for various $\{R_1, R_2, R_3, R_4\}$ and $\gamma \in \{0, 30\}[dB]$.

TABLE 6

| γ (dB) | Bits/OFDM symbol | | | | Optimal IP (dB) | Heuristic (dB) | Random (dB) |
|---|---|---|---|---|---|---|---|
| | $R_1$ | $R_2$ | $R_3$ | $R_4$ | | | |
| 0 | 256 | 256 | 256 | 256 | 39.93 | 40.24 | 42.93 |
| | 128 | 128 | 384 | 384 | 40.38 | 40.93 | 43.10 |
| | 64 | 64 | 448 | 448 | 41.03 | 41.56 | 43.31 |
| 30 | 256 | 256 | 256 | 256 | 55.92 | 57.86 | 62.41 |
| | 128 | 128 | 384 | 384 | 50.74 | 52.20 | 57.08 |
| | 64 | 64 | 448 | 448 | 46.71 | 48.01 | 53.31 |

As expected, the optimal IP yielded the minimum $P_T$ for all cases. The $P_T$ values from the suboptimal algorithm were reasonably close to the minimum values. The performance gap between the optimal IP and the suboptimal algorithm did not exceed 0.55 dB, when γ=0 dB, and 1.94 dB, when γ=30 dB. The random algorithm was worse than the others. That is, the maximum additionally required power was 3.00 dB, when γ=0 dB, and 6.60 dB, when γ=30 dB.

To further examine the performance degradation of the algorithms against the optimal IP, additional experiments with the optimal IP were performed for various $\{R_1, R_2, R_3, R_4\}$.

Table 7 describes the data rates obtained by the additionally required power of the heuristic and random algorithms with respect to the optimal IP.

TABLE 7

| γ (dB) | Bits/OFDM symbol | | | | Optimal IP (dB) |
|---|---|---|---|---|---|
| | $R_1$ | $R_2$ | $R_3$ | $R_4$ | |
| 0 | 256 | 256 | 256 | 256 | 39.93 |
| | 262 | 262 | 262 | 262 | 40.24 |
| | 316 | 316 | 316 | 316 | 42.93 |
| | 128 | 128 | 384 | 384 | 40.38 |
| | 140 | 140 | 396 | 396 | 40.93 |
| | 186 | 186 | 442 | 442 | 43.10 |
| | 64 | 64 | 448 | 448 | 41.03 |
| | 76 | 76 | 460 | 460 | 41.56 |
| | 116 | 116 | 500 | 500 | 43.31 |
| 30 | 256 | 256 | 256 | 256 | 55.92 |
| | 306 | 306 | 306 | 306 | 57.86 |
| | 424 | 424 | 424 | 424 | 62.41 |
| | 128 | 128 | 384 | 384 | 50.74 |
| | 150 | 150 | 406 | 406 | 52.20 |
| | 246 | 246 | 502 | 502 | 57.08 |
| | 64 | 64 | 448 | 448 | 46.71 |
| | 78 | 78 | 464 | 464 | 48.01 |
| | 148 | 148 | 532 | 532 | 53.31 |

For example, when γ=0 dB, 40.24 dB, which was needed for {256,256,256,256} using the heuristic algorithm in Table 6, achieved {262,262,262,262} with the optimal IP. The performance degradation of the heuristic algorithm was less than 12 bits/OFDM symbol per user, when γ=0 dB, and was less than 50 bits/OFDM symbol per user, when γ=30 dB. In the case of random algorithm, the maximum loss was 60 bits/OFDM symbol per user, when γ=0 dB, and 128 bits/OFDM symbol per user, when γ=30 dB.

As indicated above, the simulation results for the multiuser-MISO/OFDMA systems were the average of 100 trials.

Table 8 shows the resulting transmission power $P_T$ for various $\{R_1, R_2, R_3, R_4\}$ and $\gamma \in \{0, 30\}[dB]$.

TABLE 8

| γ (dB) | Bits/OFDM symbol | | | | Optimal IP (dB) | Heuristic (dB) | Random (dB) |
|---|---|---|---|---|---|---|---|
| | $R_1$ | $R_2$ | $R_3$ | $R_4$ | | | |
| 0 | 128 | 128 | 128 | 128 | 38.28 | 38.84 | 42.71 |
| | 64 | 64 | 192 | 192 | 38.93 | 39.92 | 42.86 |
| | 32 | 32 | 224 | 224 | 39.87 | 40.83 | 43.18 |
| 30 | 128 | 128 | 128 | 128 | 55.15 | 56.70 | 62.02 |
| | 64 | 64 | 192 | 192 | 50.12 | 51.67 | 57.02 |
| | 32 | 32 | 224 | 224 | 46.40 | 47.74 | 53.48 |

As expected, the optimal IP showed the minimum $P_T$ for all cases. The $P_T$ values from the suboptimal algorithm were reasonably close to the minimum values. The performance gap between the optimal IP and the suboptimal algorithm was less than 0.99 dB, when γ=0 dB, and 1.55 dB, when γ=30 dB. The random algorithm was worse than the others. That is, the maximum additionally required power was 3.93 dB, when γ=0 dB, and 7.08 dB, when γ=30 dB.

For the single-user-MIMO/OFDMA system, the simulation results were the average of 20 trials.

The resulting transmission power $P_T$ is shown in Table 9.

TABLE 9

| γ (dB) | Bits/OFDM symbol | | | | Optimal IP (dB) | Subop-timal LP (dB) | Heu-ristic (dB) | Ran-dom (dB) |
|---|---|---|---|---|---|---|---|---|
| | $R_1$ | $R_2$ | $R_3$ | $R_4$ | | | | |
| 0 | 128 | 128 | 128 | 128 | 37.05 | 37.24 | 37.30 | 40.57 |
| | 64 | 64 | 192 | 192 | 37.24 | 37.46 | 37.56 | 41.06 |
| | 32 | 32 | 224 | 224 | 37.56 | 37.80 | 37.84 | 40.82 |
| 30 | 128 | 128 | 128 | 128 | 52.52 | 53.11 | 53.41 | 55.95 |
| | 64 | 64 | 192 | 192 | 47.42 | 47.49 | 48.43 | 52.59 |
| | 32 | 32 | 224 | 224 | 43.36 | 43.70 | 44.29 | 49.79 |

In Table 9, the optimal IP yielded the minimum $P_T$ for all cases. The $P_T$ values from the suboptimal algorithms were reasonably close to the minimum values. The performance gap between the optimal IP and the suboptimal LP algorithm did not exceed 0.24 dB, when γ=0 dB, and did not exceed 0.59 dB, when γ=30 dB. In the case of the heuristic algorithm, the gap was less than 0.32 dB, when γ=0 dB, and was less than 0.01 dB, when γ=30 dB. The random algorithm was worse than the others. That is, the maximum additionally required power was 3.82 dB, when γ=0 dB, and 6.43 dB, when γ=30 dB.

To compare the performance of the above three systems, additional simulations were performed when all systems has the same number of subchannels. The parameters were shown in Table 10 and the heuristic algorithm was applied.

TABLE 10

| | Multiuser-MIMO/OFDMA | Multiuser-MISO/OFDMA | Single-user-MIMO/OFDMA |
|---|---|---|---|
| $N_T$ | 4 | 4 | 4 |
| $N_R$ | 2 | 1 | 4 |
| M | 2 | 4 | 1 |
| # of FFT (N) | 64 | 64 | 64 |
| Total # of subchannels | 256 | 256 | 256 |
| # of users (K) | | 4 | |
| # of max. bits (C) | | 12 | |
| Required BER | | $10^{-4}$ | |
| Channel | 8-tap frequency selective Rayleigh fading channels with exponentially decaying power profiles were assumed. The channel parameters were fixed during one frame period. The average channel magnitudes of the different users were generally unequal and the difference, denoted by γ, between the strongest and weakest channels of the four users was either zero or 30 dB. | | |

In Table 10, the simulation results were the average of 100 trials.

Table 11 shows the resulting transmission power P, for various $\{R_1,R_2,R_3,R_4\}$ and $\gamma \in \{0,30\}[dB]$.

TABLE 11

| γ (dB) | Bits/OFDM symbol | | | | Multiuser-MIMO/ OFDMA (dB) | Multiuser-MISO/ OFDMA (dB) | Single-user-MIMO/ OFDMA (dB) |
|---|---|---|---|---|---|---|---|
| | $R_1$ | $R_2$ | $R_3$ | $R_4$ | | | |
| 0 | 256 | 256 | 256 | 256 | 40.28 | 44.93 | 38.52 |
| | 128 | 128 | 384 | 384 | 41.06 | 48.41 | 38.79 |
| | 64 | 64 | 448 | 448 | 41.70 | 51.29 | 38.90 |
| 30 | 256 | 256 | 256 | 256 | 57.88 | 64.46 | 54.26 |
| | 128 | 128 | 384 | 384 | 52.35 | 57.22 | 49.29 |
| | 64 | 64 | 448 | 448 | 48.09 | 53.53 | 45.68 |

As shown in Table 11, the single-user-MIMO/OFDMA, which has the maximum number of receiver antennas, yielded the minimum $P_T$ and the multiuser-MISO/OFDMA, which has the minimum number of receiver antennas, yielded the maximum $P_T$. The performance gap between the single-user-MIMO/OFDMA and the multiuser-MIMO/OFDMA did not exceed 2.8 dB, when γ=0 dB, and did not exceed 3.62 dB, when γ=30 dB. The multiuser-MISO/OFDMA was worse than the others. That is, the maximum additionally required power was 12.39 dB, when γ=0 dB, and 10.20 dB, when γ=30 dB.

Figure 3:
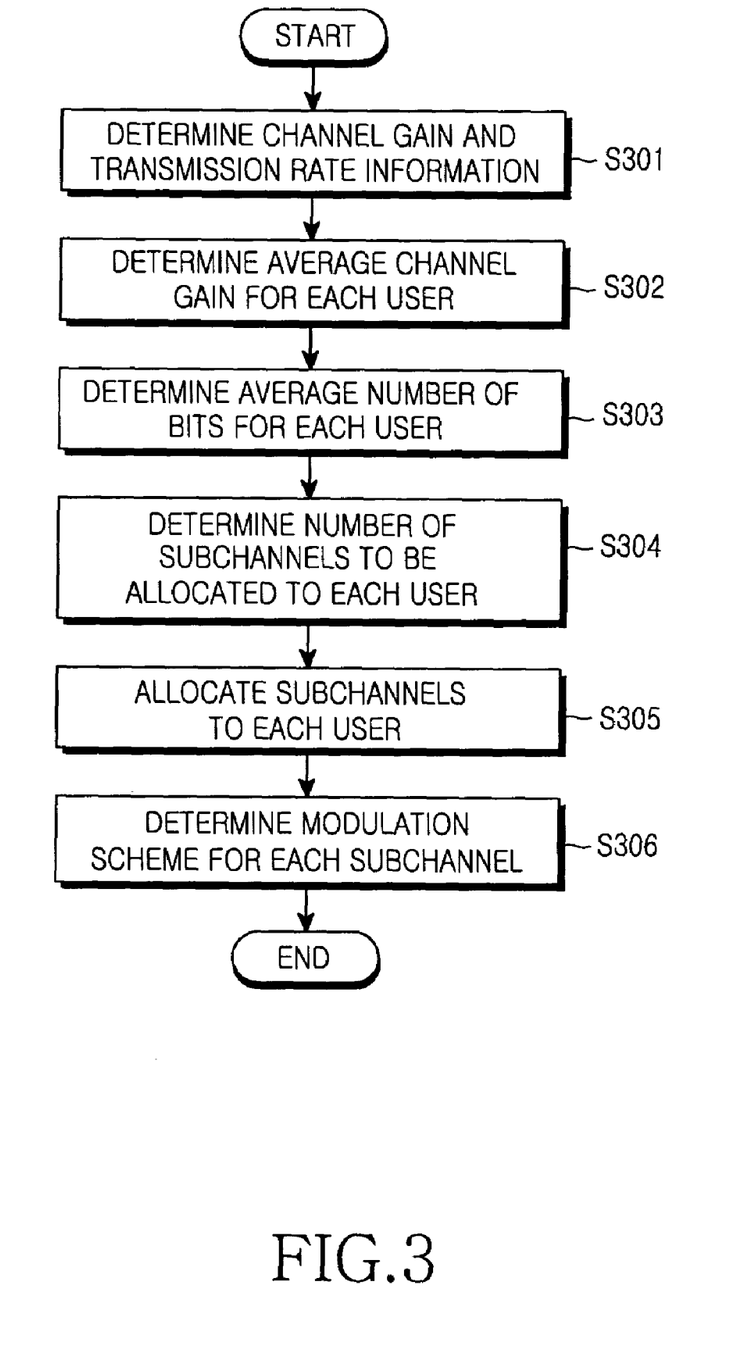
FIG. 3 is a flow chart illustrating the subchannel and bit allocation method in accordance with the present invention.

FIG. 3 is a flow chart illustrating a subchannel and bit allocation method in accordance with the present invention. As illustrated in FIG. 3, the subchannel and bit allocation method computes channel gain and transmission rate information using feedback information from terminals in Step S301, and computes an average channel gain according to a computed channel gain for each user in Step S302. When the average channel gain for each user has been determined, the average number of bits to be allocated to a corresponding user is determined in Step S303. The number of subchannels to be allocated to each user is determined in Step S304. Subchannels are allocated to each user according to the determined number of subchannels in Step S305.

After the subchannels are allocated to each user, a modulation scheme is determined on a channel-by-channel basis in Step S306.

As is apparent from the description above, the subchannel and bit allocation method for multiuser-MIMO/OFDMA systems (including its special systems) in accordance with the present invention can optimize subchannel and bit allocation using IP. Further, the subchannel and bit allocation method in accordance with the present invention can obtain the performance close to that of the optimal IP algorithm using an efficient suboptimal algorithm for separately performing a subchannel and bit allocation process.

Additionally, the subchannel and bit allocation method in accordance with the present invention can considerably improve frequency use efficiency as well as a power gain by adaptively allocating subchannels and bits according to channel environments, as compared with a system using a fixed modulation scheme.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A resource allocation method in a multiple-input multiple-output/orthogonal frequency division multiple access (MIMO/OFDMA) system including a base station for transmitting signals through a plurality of transmitter antennas, and a plurality of terminals for receiving the signals through receiver antennas, the method comprising:
   determining, at the base station upon receipt of feedback information, at least one of a channel gain and transmission rate for each user terminal;
   computing an average channel gain for each said user terminal according to the determined channel gain;
   determining an average number of bits for each said user terminal using the determined average channel gain;
   determining a number of subchannels for each said user terminal according to the determined average number of bits for each said user terminal; and
   allocating a modulating scheme for each subchannel according to the determined number of subchannels;
   wherein the average channel gain is computed differently for each said user terminal according to one of a multiuser-MIMO/OFDMA environment, a multiuser-multiple-input single-output (MISO)/OFDMA environment, and a single-user MIMO/OFDMA environment.

2. The resource allocation method according to claim 1, wherein the average channel gain for each said user terminal in the multiuser-MIMO/OFDMA environment is computed by:

$$\alpha_k^2(l) = \frac{1}{N(K-1)} \sum_{n=1}^{N} \sum_{p=1,p \neq k}^{K} \alpha_k^2(n, l, p),$$

where K is a total number of user terminals, N is a total number of subcarriers, k and p are user terminal indices, and l is a MIMO subchannel index.

3. The resource allocation method according to claim 1, wherein the average channel gain for each said user terminal in the multiuser-MISO/OFDMA environment is computed by:

$$\alpha_k^2(l) = \frac{1}{N(K-1)} \sum_{n=1}^{N} \sum_{p=1,p \neq k}^{K} \alpha_k^2(n, p),$$

where K is a total number of user terminals, N is a total number of subcarriers, and k and p are user terminal indices.

4. The resource allocation method according to claim 1, wherein the average channel gain for each said user terminal in the single-user-MIMO/OFDMA environment is computed by:

$$\alpha_k^2(l) = \frac{1}{N} \sum_{n=1}^{N} \alpha_k^2(n, l),$$

where N is a total number of subcarriers, and l is a MIMO subchannel index.

5. The resource allocation method according to claim 1, wherein the average channel gain for each said user terminal is computed by:

$$\alpha_k^2(l) = \frac{1}{N(K-1)} \sum_{n=1}^{N} \sum_{p=1,p \neq k}^{K} \alpha_k^2(n, l, p)$$

in a multiuser-MIMO/OFDMA environment, is computed by:

$$\alpha_k^2(l) = \frac{1}{N(K-1)} \sum_{n=1}^{N} \sum_{p=1,p \neq k}^{K} \alpha_k^2(n, p)$$

in a multiuser-multiple-input single-output (MISO)/OFDMA environment, and is computed by:

$$\alpha_k^2(l) = \frac{1}{N} \sum_{n=1}^{N} \alpha_k^2(n, l)$$

in a single-user-MIMO/OFDMA environment,
where K is a total number of user terminals, N is a total number of subcarriers, k and p are user terminal indices, and l is a MIMO subchannel index.

6. The resource allocation method according to claim 1, wherein the number of subchannels for each said user terminal is computed using Vogel's method, which is modified such that additional constraints are taken into account in a multiuser-MIMO/OFDMA environment, and a multiuser-multiple-input single-output (MISO)/OFDMA environment.

7. The resource allocation method according to claim 1, wherein the number of subchannels for each said user terminal is computed using Vogel's method in a single-user-MIMO/OFDMA environment.

8. The resource allocation method according to claim 1, wherein the number of subchannels for each said user terminal is computed using Vogel's method, which is modified such that additional constraints are taken into account in a multiuser-MIMO/OFDMA environment.

9. The resource allocation method according to claim 1, wherein the number of subchannels for each said user terminal is computed using Vogel's method, which is modified such that additional constraints are taken into account in a multiuser-multiple-input single-output (MISO)/OFDMA environment.

10. The resource allocation method according to claim 1, wherein the number of subchannels for each said user terminal is computed using Vogel's method, which is modified such that additional constraints are taken into account in a single-user-MIMO/OFDMA environment.

* * * * *